United States Patent Office 3,489,701
Patented Jan. 13, 1970

3,489,701
FLEXIBLE PHENOLIC RESINS
Sung Ki Lee, Niagara Falls, N.Y., assignor to Hooker Chemical Corporation, Niagara Falls, N.Y., a corporation of New York
No Drawing. Filed Aug. 1, 1966, Ser. No. 569,043
Int. Cl. C08g 5/10
U.S. Cl. 260—17.2                4 Claims

ABSTRACT OF THE DISCLOSURE

A method for making flexible phenolic resins, useful for interior can coatings, drum and pail linings, wire coatings, laminating resins, baking primers, adhesives, pipe coatings, phenolic molding resins, foundry resins and the like, comprises the steps of:
 (1) reacting a polymer containing an $\alpha,\beta$-carbon-to-carbon unsaturated carbonyl function with a nucleophilic compound having at least two active hydrogens, to form a polymer containing an active pendant nucleophilic group containing at least one active hydrogen,
 (2) reacting the resultant nucleophilic group containing active hydrogen on the said polymer with an aldehyde to form a polymer containing an active pendant methylol derivative group,
 (3) reacting said pendant methylol group with an aromatic compound containing an ortho-para activating group, to form a modified polymer containing a pendant aralkylene group containing at least one nuclear hydrogen capable of further condensation with an aldehyde,
 (4) reacting the said pendant aralkylene group on the modified polymer with a compound selected from the group consisting of an aldehyde, a compound containing a C-methylol group, and mixtures thereof, to form a modified polymer containing a pendant aralkylene methylol polymer, and recovering the polymer so produced.
Each step can be carried out as a separate reaction, and separately controlled to give the resultant desired polymer properties in a single reaction vessel in sequence.

This invention relates to flexible phenolic resins. More particularly, this invention relates to a method for preparing a flexible phenolic polymer which has a good flexibility, impact resistance and color stability, by condensing a heterochain polymer containing an $\alpha,\beta$-carbon-to-carbon unsaturated carbonyl group with a phenolic compound.

Heretofore, the relatively poor flexibility, impact resistance and color stability of phenolic resins have limited the scope of utility of such resins. In the field of coatings on various metallic and non-metallic surfaces, for example, coatings of phenolic resins, which have been formed by applying an organic solvent and curing to a hard, infusible state, are not only brittle but have poor adhesion to the surface to which they have been applied. Also, the use of phenolic based materials as laminating resins in electrical apparatus applications requires that they have a certain degree of flexibility and impact resistance in order to be useful in the preparation of cold punch stock.

Previous efforts to improve the properties of phenolic resins have been directed toward the use of various additives and plasticizers (modifiers) or by the use of various substituted phenols. These modified materials are economically unsuitable, and in many instances still have been known to have undesirable properties.

It is an object of this invention, therefore, to provide a flexible phenolic resin from an entirely different method than that used in the past.

It is a further object to provide a general purpose heterochain polymer which has a wide range of application in the fields of thermoset as well as thermoplastic resins.

Another object is to prepare a polymer which has both controllable flexibility and curability.

Another object is to prepare a polymer that is a base resin intermediate which can be used as such or reacted further to produce a flexible phenolic resin.

These and other related objects are achieved by the discovery of a method for preparing a flexible thermosetting polymer in one reaction vessel which comprises:
 (1) Reacting a polymer containing an $\alpha,\beta$-carbon-to-carbon unsaturated carbonyl function with a nucleophilic compound having at least two active hydrogens, to form a polymer containing an active pendant nucleophilic group containing active hydrogen, and
 (2) Reacting the resultant nucleophilic group containing active hydrogen on the said pendant group on the polymer with a compound selected from the group consisting of an aldehyde, a compound containing a C-methylol group, and mixtures thereof, and recovering the product so produced.

In step (2), when a compound containing a C-methylol group, that is, a resole, is the compound used, the result is the formation of a modified polymer containing pendant aralkylene groups, which is a non-heat curable resole or B-stage resin in which each successive nucleus is connected by a methylene group and/or oxymethylene $((-CH_2O)_n)$ linkages, which can be cured to a resite or a C-stage resin in which the cross-linking by electron bonds occurs and the product becomes infusible, yet is flexible.

In step (2), when an aldehyde is the compound used, the result is to form a polymer containing an active pendant methylol derivative group. This resultant polymer is a base resin intermediate which can be used as such or reacted further in accordance with steps (3) and (4) below to produce a flexible phenolic resin, as follows:
 (3) Reacting the methylol derivative in the resultant polymer of step (2) with an aromatic compound containing an ortho-para activating group, to form a modified polymer containing a pendant aralkylene group containing at least one nuclear hydrogen capable of further condensation, and
 (4) Reacting the resultant modified polymer of step (3) with an aldehyde to form a modified polymer containing a pendant aralkylene polymer which is a resole or B-stage resin in which each successive nucleus is connected by a methylene group and/or oxymethylene $((-CH_2O-)_n)$ linkages which can be cured to a resite or a C-stage resin in which the cross-linking by electron bonds occurs and the product becomes infusible, yet is flexible.

As indicated above, each of the four reaction steps enumerated can be carried out in the same reaction vessel in sequence. Each step of the reactions of the process can be carefully followed by the use of conventional infrared analysis, by the more recent technique of Attenuated Total Internal Reflection (also known in the art as "ATR") and by other quantitative titrametric analytical methods. Because of this, one of the especially remarkable aspects of this invention is that each step above enumerated can be varied individually to adjust the resultant desired polymer properties, such as flexibility and curability, so that almost any type of property or set of properties that is desired can be obtained by the use of this invention.

NUCLEOPHILIC ADDITION (STEP 1)

In step (1), the preferred starting material polymers are polyesters containing $\alpha,\beta$-carbon-to-carbon unsaturation, and are already defined in the literature. In addition to polyesters, the polymer containing an $\alpha,\beta$-carbon-to-carbon unsaturated carbonyl functions can be formed from $\alpha,\beta$-unsaturated polycarbonyls (i.e, polyketones), $\alpha,\beta$-unsaturated polyamides and $\alpha,\beta$-unsaturated polyamide esters. To make unsaturated polyamides, in place of the glycol a diamine is used. To make unsaturated polyamide esters, either a dicarboxylic acid with an amino alcohol or a glycol with unsaturated amic acids, such as maleamic acid and fumaramic acid, is used.

The starting polymer for step (1) of this invention should preferably have a degree of polymerization of at least 3 (i.e., DP=3) and contain at least one $\alpha,\beta$-carbon-to-carbon unsaturated carbonyl function. It is to be understood, however, that the polymer may have a degree of polymerization higher than 3, such as a DP of 100, and may have more than one, $\alpha,\beta$-carbon-to-carbon unsaturated carbonyl functions. They can be prepared with various properties by varying the ratio of the difunctional compounds containing the unsaturated and saturated linkages. In this way, polyesters of varying properties can be obtained. Since the bridging or condensation of the polyester with the phenolic resin will take place at the nucleophilic center attached to the $\alpha,\beta$-carbon-to-carbon unsaturation, the amount of bridging or cross-linking sites that are desirable in any given polymer can be varied by varying the amount of unsaturated acid which is used in the polyester. In general, it can be said that if one uses one mole of an anhydride there must be one mole of glycol present to react with it. Essentially, the mole ratio of acid monomer to alcohol monomer should be between abut 1:1 and 1:1.5 on a molar basis.

The acids which may be used to prepare the polyester of step (1) in my process may be from among any of those known in the art which are known as anhydrides, half-esters, dicarboxylic acids, acid chlorides, $\omega$-hydroxy acids and $\omega$-amino carboxylic acids, as well as $\omega$-mercapto acids. The polyester acid monomer should contain a known amount of $\alpha,\beta$-carbon-to-carbon unsaturation adjacent the carboxyl group. The polyester may also contain saturated acid moieties as well, to adjust the ratio of unsaturation to polymer length.

Examples of unsaturated anhydrides which may be used to form the polyester of step (1) are: maleic, chloromaleic, lower alkylmaleic containing from one to 18 carbon atoms, such as ethylmaleic, itaconic, citraconic, zeronic, pyrococinchoninic and acetylene dicarboxylic, either alone or in mixtures.

Among the unsaturated half-esters which can be used in the preparation of the polyester of this invention are: lower $\beta$-carboalkoxy acrylic acid of one to 18 carbon atoms, such as $\beta$-carbomethoxy acrylic acid, and $\beta$-carboethoxy acrylic acid, the alcoholated, the aminolated, and the thiolated products of the above-mentioned unsaturated anhydrides.

Among the unsaturated dicarboxylic acids and acid chlorides which can be used in the preparation of the polyester of step (1) of this invention are: maleic acid, fumaric, itaconic, citraconic, mesaconic, glutaconic and lower alkyl glutaconic of one to 18 carbon atoms, acetylene dicarboxylic acid, chloromaleic acid, chlorofumaric acid, bromomaleic acid, fluoromaleic acid, and the like.

Among the unsaturated $\omega$-hydroxy acids which may be used to prepare the polyester of step (1) of this invention are: $\gamma,\gamma$-diethyl-$\gamma$-hydroxycrotonic acid, $\beta$-hydroxyacrylic acid, $\beta$-lower alkyl hydroxyacrylic acid of one to 18 carbon atoms, such as $\beta$-hydroxyalkyl acrylic acid.

Among the $\omega$-amino unsaturated carboxylic acids which may be used to prepare the polyester of step (1) of this invention are: $\gamma,\gamma$-diethyl-$\gamma$-aminocrotonic acid, $\beta$-amino- acrylic acid, $\beta$-lower alkylamino acrylic acid of one to 18 carbon atoms, such as $\beta$-aminoethyl acrylic acid.

Among the $\omega$-mercapto unsaturated carboxylic acids which may be used to prepare the polyester of step (1) of this invention are: $\gamma,\gamma$-diethyl-$\gamma$-mercaptocrotonic acid, $\beta$-mercaptoacrylic acid, $\beta$-lower alkylmercapto acrylic acid of one to 18 carbon atoms, such as $\beta$-mercaptoethyl acrylic acid.

As mentioned above, the polyester of step (1) may also be prepared from a mixture of unsaturated dicarboxylic acids with saturated dicarboxylic compounds which are well known in the art and can include: glutaric acid, succinic acid, adipic acid, sebacic acid, dicarboxylic acids of one to 18 carbon atoms, lower alkylene of six to sixty carbon atoms, alkyl dimeric acids, halogenated dicarboxylic acids, such as hexachloroglutaric acid and hexafluoroglutaric acid, aromatic dicarboxylic acids, such as phthalic acid and anhydride, terephthalic acid and isophthalic acid and alicyclic dicarboxylic acids and anhydrides, such as chlorendic anhydride.

In addition, the polyester of step (1) of the above process is formed from a hydroxy compound which is also well known in the art. Examples of such hydroxy compounds are ethylene glycol, diethylene glycol, propylene glycol, dipropylene glycol, polyglycol, butane diol, pentane diol, hexane diol, glycerol, mannito, sorbitol, hydrogenated bisphenols, lower alkene diols of four to 18 carbon atoms, such as butene diol, pentene diol, hexene diol, oxyalkylated bisphenols of one to 18 carbon atoms, such as oxyethylated and oxypropylated bisphenols, substituted oxyalkylated bisphenols of one to 18 carbon atoms and substituted with halogens selected from chlorine, bromine, fluorine, sulfonic and the like, bisoxyalkylated hydroxyphenyl sulfones, such as bisoxyethylated and bisoxypropylated hydroxyphenyl sulfones, oxyalkylated polymethylene bisphenols where the polymethylene group has from two to 18 carbon atoms and the oxyalkylation groups have from two to three carbon atoms, and mixtures thereof.

The ratio of unsaturated acid to saturated acid used to form the polyester of step (1) of this method can be varied within wide limits, depending on the ultimate properties desired in the flexible phenolic resin. Also, the nature of the hydroxy compound used in the polyester should be taken into consideration with the saturated acid aspect of the resulting polyester. In an approximate sense, the saturated acid portion of the polyester can be considered with the saturated glycol portion of the polyester as imparting flexibility and stability to the ultimately desired flexible phenolic resin. The polyester resins of the above description are already well known in the polyester art and in general impart two desirable characteristics to the resultant flexible phenolic polymer:

(a) They give active unsaturated sites which can be used to chemically modify the polymer by having attached to it active pendant functional groups.

(b) The polyester linkage may also provide the flexibility and stability to the resultant polymer.

Step (1) of my process, on the nucleophilic addition of an active hydrogen compound to the $\alpha,\beta$-unsaturated carbon-to-carbon double bond, is illustrated by equation (1):

(1) 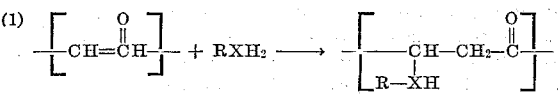

where $RXH_2$ is a nucleophile in which the hetero atom, X, is nitrogen, oxygen, phosphorus, sulfur, and the like, and R is as defined below.

Where the nucleophilic compound contains nitrogen, the compound must be a primary amine in order to provide an active pendant group for the subsequent modifications. Among the hetero nitrogen nucleophilic compounds which may be used are cyanamide ($H_2N-C\equiv N$), ammonia, 2,4,6-triaminophenol, phenylhydrazine, hydrazine, hydrazine-hydrochloride, urea, N-phenylhydroxylamine

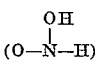

benzaldehyde oxime, 2-methylpyrrole

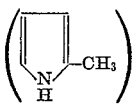

2,3-dimethylpyrazines, carbamyl azide

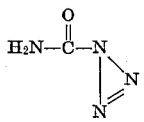

diazamethane ($CH_2N_2$), dicyanodiamide, guanidine

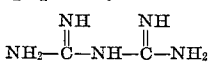

2-amino-2-methyl-1,3-propanediol, and the like.

Other examples of compounds containing nitrogen hetero groups are thiourea, lower alkanol amines of two to 18 carbon atoms, such as ethanolamine, lower alkylamines of one to 20 carbon atoms, such as methylamine, ethylamine, propylamine, butylamine, amylamine, dodecylamine and tallowamine, alicyclic amines from five to 20 carbon atoms, such as cyclohexylamine and cycloheptylamine, aniline, substituted anilines wherein the substituents may be hydrogen, lower alkyl of one to 20 carbon atoms, aryl from six to 20 carbon atoms, halogens selected from chlorine, fluorine, bromine and iodine, hydroxy, sulfonyl

sulfone ($=SO_2$), sulfate ($-SO_4$) sulfonic ($SO_2H$), phosphate ($-PO_4$), phosphites ($-PO_3H$), nitro, nitroso and lower alkoxy from one to 20 carbon atoms.

Where the nucleophilic compound contains oxygen, each oxygen has only one hydrogen bonded to it which can undergo nucleophilic addition. The second active hydrogen can be supplied in the compound through a second oxygen or some other hetero atom in the compound, such as phosphorus, sulfur or nitrogen. In this case, the phosphorus, sulfur or nitrogen compound has at least one additional active hydrogen in the molecule. An exception to this is the case of water ($H_2O$) which does not react in this way and is not included within the scope of this definition.

Among the hetero oxygen nucleophilic compounds which may be used are: cellulose (Cell-OH), oximes

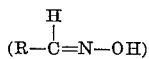

such as benzaldehyde oxime, glycols such as ethylene glycol and propylene glycol, hydrogen peroxide ($H_2O_2$), hydroquinone, 2,6-dihydroxymethyl, phenol, oxyalkylated bisphenol of 1 to 18 carbon atoms such as oxyethylated bisphenol, 2,4,6-triaminophenol, N-hydroxymethylcyanamide

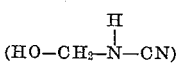

and the like.

Where the nucleophilic compound contains phosphorus, the phosphorus can be in either the tri- or pentavalent state. The two active hydrogens can be either directly bonded to the phosphorus, such as in lower alkyl phosphines, or indirectly bonded to the phosphorus through other hetero atoms, such as nitrogen, sulfur and oxygen. Among the hetero phosphorus nucleophilic compounds that may be used are: tris-hydroxymethylphosphine, meth-ylphosphonic acid, phosphine, bis(hydroxymethyl)phosphinic acid (BHMP®), methyl acid phosphate

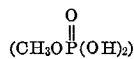

butyl acid phosphate, and the like.

Other examples of compounds containing phosphorus hetero groups are lower alkyl phosphines ($RPH_2$) of one to 20 carbon atoms, such as methylphosphine, ethylphosphine, propylphosphine, butyl- and decyl-phosphine, dodecylphosphine, and stearylphosphine, phosphonic acid ($HP(O)(OH)_2$), lower alkyl phosphonic acid where the alkyl has from one to 18 carbon atoms and lower alkyl phosphorus amides of from one to 18 carbon atoms, such as N-methyl phosphorus amide.

Where the nucleophilic compound contains sulfur, the sulfur can be in any of its multivalent states. The two active hydrogens can be either directly bonded to the sulfur, such as in hydrogen sulfide, or indirectly bonded to the sulfur through other hetero atoms, such as nitrogen, oxygen, phosphorus or other sulfur. In the case where the nucleophilic compound is hydrogen sulfide ($H_2S$), then R is zero.

Among the hetero sulfur nucleophilic compounds which may be used are: thiourea

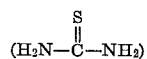

acetonethiosemicarbazone

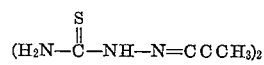

thiosulfuric acid

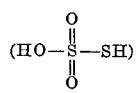

p-aminobenzenethiol ($H_2N-C_6H_4-SH$), hydrogen sulfide ($H_2S$), 2-thioethanol ($HO-CH_2-CH_2-SH$), and the like.

Compounds containing hetero atoms of arsenic and boron may also be used. Examples of such hetero arsenic compounds are tris-hydroxymethyl arsine, methylarsonic acid, arsine, bis(hydroxymethyl)arsinic acid, methyl acid arsenate, butyl acid arsenate, lower alkyl arsines ($RAsH_2$) of one to 20 carbon atoms, such as methylarsine, ethylarsine, propylarsine, butylarsine, dodecylarsine and stearylarsine. When using an arsine such as tris-hydroxymethyl arsine, the nucleophilic reaction would be conducted in a manner after Example 5 below.

Examples of such hetero boron compounds are boric acid ($B(OH)_3$), metaboric acid, diborane ($B_2H_6$), triborane ($B_3H_7$), tetraborane ($B_4H_{10}$), pentaborane ($B_5H_9$ and $B_5H_{11}$), hexaborane ($B_6H_{10}$ and $B_6H_{12}$), enneaborane ($B_9H_{13}$ and $B_9H_{15}$), decaborane ($B_{10}H_{14}$ and $B_{10}H_{16}$), as well as derivatives of boron with nitrogen such as borazole

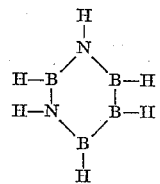

and with phosphorus such as the compound having empirical formula $B_3P_3C_6H_{21}$ and the cyclic structure

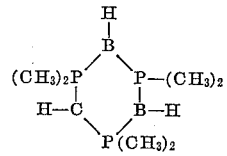

When using diborane, the nucleophilic reaction would be conducted in a manner after Example 2 below. And, when using borazole, the nucleophilic reaction would be conducted in a manner after Example 1.

The R in the Equation 1 can be hydrogen, lower alkyl, substituted alkyl, aryl, substituted aryl, alicyclic, carbamidoyl

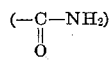

and thioamidoyl, and in the case of hydrogen sulfide is zero.

The alkyl groups in R can have from one to 18 carbon atoms. The substituents on the substituted alkyl groups can be hydrogen, lower alkyl of one to 18 carbon atoms, halogens selected from chlorine, fluorine, bromine and iodine, aryl of six to 20 carbon atoms.

The substituents on the substituted aryl groups can be hydrogen, lower alkyl of one to 18 carbon atoms, halogens selected from chlorine, fluorine, bromine and iodine, aryl of six to 20 carbon atoms, sulfone ($=SO_2$), sulfonic ($-SO_2H$), nitro, nitroso, hydroxy, lower alkoxy of one to 18 carbon atoms.

Examples of aryl groups are phenyl, naphthyl, toluyl and the like.

Examples of alicyclic compounds are cyclohexyl, decalin, tetralin, cyloheptyl, cyclopentyl, bicyclic compounds such as norborinyl and the like.

The nucleophile ($RXH_2$) to be used depends on the desired properties of the ultimate product.

It is important that the mole ratio of the nucleophilic compound to the molar amount of $\alpha,\beta$-unsaturation in the polymer be at least about 1:1. If less than the molar equivalent of unsaturation is added, then there remains in the polymer some unreacted double bonded material. Under this condition, the resultant adduct undergoes secondary addition with the excess unsaturated portion of the remaining polymer; thus reducing available active sites for the subsequent reaction. If a molar excess of nucleophilic compound is added, this excess remains in the mixture and may react preferentially with the subsequently added reagents.

The reaction can be followed by use of various known titrametric analytical methods, as well as by infrared analysis and by Attenuated Total Internal Reflection ("ATR") analysis.

The temperature to be used in carrying out the nucleophilic addition step will vary with the nature of the unsaturated polymer and with the activity of the nucleophilic agent. In general, however, this temperature range is between about zero degrees centigrade and about 250 degrees centigrade. The preferred temperature range is between about 50 degrees centigrade and about 150 degrees centigrade. At temperatures above the maximum temperature, a retrograde reaction may result, because the reaction can be reversed by thermal induction. At temperatures below the minimum temperature, the reaction tends to become sluggish.

The reaction is carried out under generally basic conditions, i.e., at a pH greater than 7. Under acid conditions, with amines, for example, ammonium salts are formed which do not react satisfactorily.

METHYLOLATION (STEP 2)

Regarding step (2) on the methylolation of the active hydrogen on the pendant group attached to the polymer, this is illutsrated by equation (2):

(2)
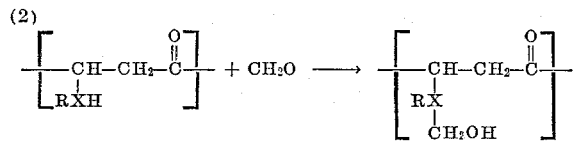

where R and X are as defined below.

While the equation above uses formaldehyde to illustrate the reaction, it is to be understood that any aldehyde reactive iwth nucleophilic hydrogen may be used in this invention. Examples of aldehydes to be embraced within the scope of this invention are formaldehyde, including paraformaldehyde and trioxane, acetaldehyde, propionaldehyde, butyraldehyde, isobutyraldehyde, benzaldehyde, furfural, 2-ethylhexanal, ethylbutyraldehyde, heptaldehyde, dialdehydes, such as glyoxal, aldols, such as hydroxy acetaldehyde, crotonaldehyde, acrolein, halogenated aldehydes where the halogens are chosen from chlorine, fluorine, bromine and iodine.

In general, the aldehyde must be capable of reacting with the reactive hydrogen on the pendant group attached to the polymer. The aldehyde can contain from one to 18 or more carbon atoms and may be substituted with other groups which do not interfere with the nucleophilic addition reaction or with subsequent reactions in steps (3) and (4). The preferred aldehyde to be used will depend upon the desired properties in the ultimate polymer.

When the aldehyde used is formaldehyde, the methyl group is unsubstituted, whereas when some other aldehyde is used the methyl group can be considered to be substituted with an alkyl or aryl substituent. For instance, when benzaldehyde is the aldehyde to be used, this can be considered to be a benzene substituted methylolation reaction. In the art, this type of reaction is known as a methylolation.

When the nucleophilic addition compound is either ammonia or a phosphine type compound, there is an extra free hydrogen directly bonded to the hetero atom on the pendant group available to react with the aldehyde. Under such circumstances, the methylolation may produce two methylol groups pending from the same hetero atom attached to the polymer group as is illustrated in Equation 3:

(3)
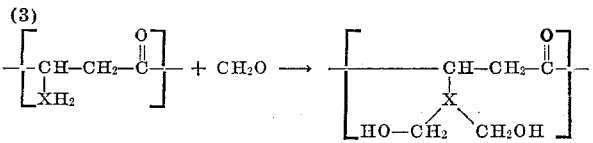

where X is as defined above.

This type of reaction is dependent largely upon the stoichiometry of the reactants.

It is important that the mole ratio of the aldehyde to the reactive hydrogen on the pendant polymer chain be at least about 1:1. If less than the molar equivalent of aldehyde is used, then cross-linking may occur between the remaining active hydrogen and the resultant methylol pendant groups to form, for instance, -aminomethyl-amino-($-N-CH_2-N-$) bonding. This reduces the number of pendant groups that are available for the subsequent reaction (step (3)). If a molar excess of aldehyde is used, this excess remains in the mixture without harm.

The temperature to be used during the reaction will again depend upon the nature of the polymer and its pendant reactive hydrogen reactivity, as well as the nature of the aldehyde to be used. These is turn will depend upon the properties of the ultimately desired polymer. In general, however, the temperature of the reaction can be between about zero degrees centigrade and about 175 degrees centigrade. At temperatures below the minimum temperature, the reaction becomes sluggish. At temperatures above the maximum temperature, condensation between reactive methyol and other reactive groups may result, to cause cross-linking. The preferred temperature range would be between about 50 degrees centigrade and 120 degrees centigrade.

X-METHYLATION OF AROMATIC COMPOUNDS (STEP 3)

After the pendant group on the polymer has been reacted with an aldehyde in step (3), the resultant methylol pendant group is then reacted with an aromatic compound containing an ortho-para activating group to produce a pendant novolac, as illustrated by Equation 4:

(4)

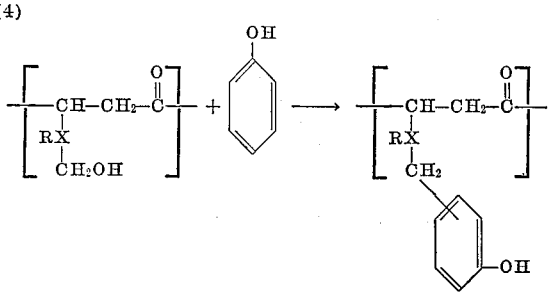

where X is as defined above, and R is as defined above.

The types of novolacs to be embraced within the scope of this invention are those chosen from phenols, phenolic novolacs, substituted phenols, thiophenols, aniline type compounds and aniline formaldehyde novolacs.

Examples of phenols which may be used in preparing the novolac of this step include phenol itself and substituted phenols having the following general formula:

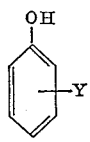

where Y may be H, F, Cl, Br, I, or a suitable substituent selected from the following:

(a) Alkyl groups of one to 18 carbon atoms in any of their isomeric forms and substituted on the phenolic nucleus in the ortho, or para positions;
(b) Alicyclic groups of 5 to 18 carbon atoms such as cyclohexyl, cyclopentyl, methyl cyclohexyl, butyl cyclohexyl, etc.;
(c) Aromatic or aralkyl groups of 6 to 18 carbon atoms such as phenyl, hydroxyphenyl, alphamethylbenzyl, benzyl, cumyl, etc.;
(d) Novolac groups having the formula:

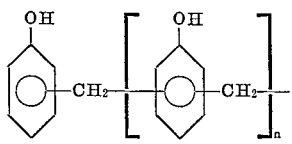

where $n$ is one to ten.

Suitable substituted phenols include the following: para-tertiary-butylphenol, para-secondary-butylphenol, para-tertiary-amylphenol, para-secondary-amylphenol, para-tertiary-hexylphenol, para-isooctyl-phenol, para-phenylphenol, para-benzylphenol, para-cyclohexylphenol, para-decyl-phenol, para-dodecyl-phenol, para-tetra-decyl-phenol, para-octa-decyl-phenol, para-nonyl-phenol, para-methyl-phenol, para-beta-naphthyl-phenol, para-alpha-naphthyl-phenol, para-pentadecyl-phenol, para-cetyl-phenol, para-cumyl-phenol, para-hydroxy acetophenone, para-hydroxy benzophenone, a phenol reacted or alkylated with limonene in any of its isometric d-, l-, or dl-forms, a phenol alkylated with styrene, a phenol alkylated with pinene in any of its isomeric α or β forms, as well as the corresponding ortho and meta derivatives such as meta-butyl phenol and ortho-butyl phenol, as well as mixtures thereof.

From the foregoing, it is apparent that substantially any phenol may be used in practicing step (3) of the present invention provided it has a reactive phenolic hydroxyl group and is capable of reacting with the hydroxy methyl group pending from the polymer, and does not have reactive functional groups which interfere with the condensation reaction. The pure refined phenols may be used, but this is not always necessary. For instance, phenols may be alkylated and then reacted with an aldehyde as the crude product which may contain some polyalkylated as well as unalkylated phenols. Mixtures of phenols mentioned may also be used.

Examples of thiophenol compounds or substituted thiophenol compounds which may be used in this step are illustrated as follows: thiophenol (mercapto phenol), sulfur phenol novolac of the formula:

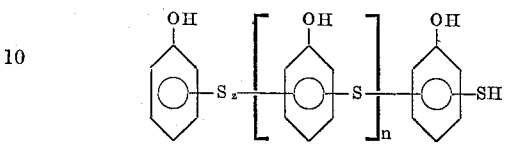

where $n$ is one to ten, substituted thiophenol where the substituents can be lower alkyl from one to 18 carbon atoms, aryl from six to 20 carbon atoms, amine ($-NH_2$), and $z$ is one to six.

Examples of anilinic type compounds having a free NH group, which may be used in this step, are as follows: aniline itself, substituted aniline where the substituents can be lower alkyl from one to 18 carbon atoms, aryl from six to 20 carbon atoms, amine ($-NH_2$), hydroxy, mercapto, aniline formaldehyde novolacs of the formula:

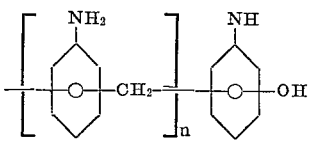

where $n$ is one to ten.

The ratio of the phenolic type compound to the methylol groups pending from the polymer way vary from 1:1 to infinity to 1, depending on the properties of the end product desired.

In those instances where the pendant group attached to the polymer has been reacted with the compound yielding two available hydrogens for reaction with the aldehyde, when the phenolic compound is then reacted with it, it is capable of obtaining a mixed product illustrated by Equation 5:

(5)

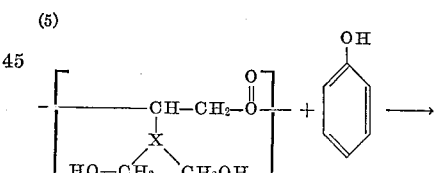

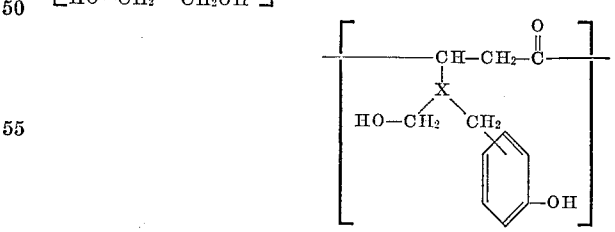

where X is as defined above.

If an excess of the phenolic compound is used over that required for the reaction with the one methylol group on the pendant group, then it is possible to also react the second hydroxymethyl group.

In step (2), when a compound containing a C-methylol group, that is, a resole, is the compound used, the result is the formation of a modified polymer containing pendant methylolated aralkylene groups, which is a non-heat curable resole or B-stage resin in which each successive nucleus is connected by a methylene group and/or oxymethylene (($-CH_2O)_n$) linkages, which can be cured to a resite or a C-stage resin in which the cross-linking by electron bonds occurs and the product becomes infusible, yet is flexible. And when an aldehyde is the compound used in step (2), the result is to form a polymer containing an active pendant methylol derivative group. This resultant polymer is a base resin intermediate which can be used as such or reacted further in accordance with steps (3) and (4) to produce a flexible phenolic resin. This illustrates the diversity of the processes of this invention in that either a base resin may be prepared (by the use of appropriate aldehydes in step (2), for example) which can be further modified later as convenient, or, any of a number of finished products may be directly prepared by the use of the appropriate reactants.

METHYLOLATION OF AROMATIC COMPOUND (FORMATION OF THE FLEXIBLE RESIN) (STEP 4)

After the modified polymer containing an active pendant alkyl aromatic group containing active nucleohydrogen of step (3) has been prepared, the next step is to add a compound selected from the group consisting of an aldehyde, a compound containing a C-methylol group, and mixtures thereof, to the resulting novolac to form a flexible thermosettable polymer containing a hetero pendant group on which is an aromatic C-methylol group. This reaction is illustrated by Equation 6:

(6)
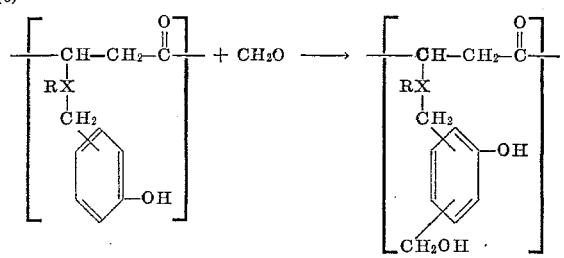

where R and X are as defined above.

Where the nucleophilic addition compound has two active hydrogen groups available after it has become attached to the polymer group (i.e., where R is hydrogen), then the resultant thermosettable phenolic compound obtained from this reaction would contain both a C-methylol group and an X-methylol group; and would appear as illustrated in Equation 7:

(7)
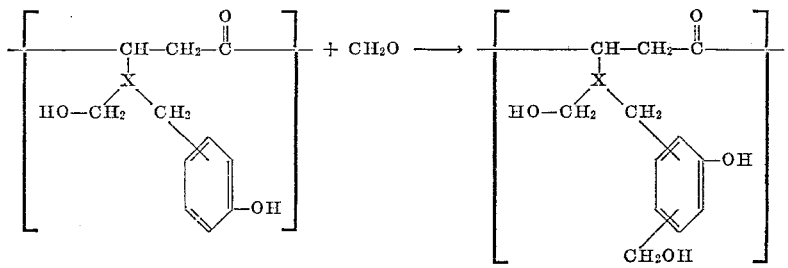

where X is as defined above.

As with step (2) on the methylolation, likewise with this step, any suitable aldehyde or mixtures of aldehydes capable of reacting with reactive hydrogen or ortho-para activated ring hydrogen to form a hydroxylmethyl group or methylol derivatives having not more than, for example, eight carbon atoms, is satisfactory for effecting the process of this invention, provided it does not contain a functional group or structure which is detrimental to the reaction. The preferred aldehyde is formaldehyde, however, this will be dependent upon the ultimately desired properties of the flexible phenolic resin. The formaldehyde may be an aqueous solution or in any of its low polymeric forms such as paraform or trioxane. Other aldehydes named above may also be used.

The ratio of the aldehyde to the novolac of step (3) may be varied within a wide range depending on the desired properties of the ultimate end product.

The temperature to be used in effecting this reaction of step (4) may vary between about zero degrees centigrade and about 200 degrees centigrade. At temperatures below zero degrees centigrade, the reaction may be sluggish. At temperatures above 200 degrees centigrade, the reaction may go beyond the C stage. The preferred temperature is between about 30 degrees centigrade and about 100 degrees centigrade.

Each of the steps illustrated above can be carried out as separate reactions, that is, in separate reaction vessels. However, it is one of the unique discoveries of this invention that each step can be carried out in a single reaction vessel in sequence. Another discovery is that the reaction product can be isolated and used accordingly, at any stage. The steps need not be carried out simultaneously but can be interrupted at any stage and re-initiated at a later date. Where the desired reaction product of step (1) is already available on the market, then the reaction of step (1) has already been carried out, and my process can be proceeded with from step (2). Likewise, where the desired compound of step (2) is already available on the market, the reactions of steps (1) and (2) have already been carried out, and I would proceed with my process at step (3).

The flexible phenolic base resins of this invention are useful for a multitude of purposes, including interior can coatings, drum and pail linings, wire coatings, laminating resins (cold punching), baking primers, adhesives, pipe coatings, reactive plasticizers and diluents, phenolic molding resins, foundry resins, grinding wheel binders, rubber tackifiers, paper coatings, textile treatments, and the like.

The invention is further illustrated in the following illustrative examples which are given for purposes of illustration only and are not to be construed as limiting except as defined in the appended claims. Unless otherwise indicated, all parts are by weight and temperatures are in degrees centigrade.

In Section I, unsaturated polyesters (polymaleates) were prepared by reacting maleic anhydride and a slight molar excess of difunctional alcohols. To these unsaturated polyesters, Michael addition of amine were carried out in the subsequent examples, to give polyamino esters. The resultant polyamino esters were then reacted with formaldehyde to give N-methylolated polyamino esters which further reacted with phenol and formaldehyde to give hetero chain polyesters.

(I) Polymaleates

Preparation of poly(oxytriethylene)maleates—Method A.—A one liter three-necked flask is equipped with a stirrer, thermometer and condenser with a Dean Stark water separator set for the azeotropic distillations. In a flask is placed 98.06 parts (one mole) of maleic anhydride, 190.17 parts (1.25 moles) of triethylene glycol and 250 milliliters of dry toluene and one gram of p-toluene-sulfonic acid. The mixture is refluxed until one mole of water is collected. The solvent is removed under reduced pressure to give a clear, light yellow unsaturated polyester of molecular weight between 1500–1800.

Method B.—A one liter three-necked flask is equipped with a stirrer, siphon, nitrogen inlet and thermometer (all reaching below the surface of the solution) and a side arm with condenser set for distillation. In the flask is placed 332 parts (2.2 moles) of triethylene glycol, which is heated to 80 degrees centigrade, after which 196 parts (2 moles) of maleic anhydride are added. The temperature is raised to 150 degrees centigrade over a one hour period, then raised to 190 degrees centigrade and held for four hours with sub-surface nitrogen bubbling into the reaction mixture. Then, vacuum was applied, until the acid number of a sample was less than 10 milligrams of KOH per gram of sample. The polyester prepared in such a manner was light yellow in color and its molecular weight ranged from 1300 to 4500.

(II) Nucleophilic addition

Example 1—Preparation of poly [β(N-phenylamino)-oxytriethylene] succinate by reaction of unsaturated polyester with aniline.—To a reaction flask containing 250 parts of the poly(oxytriethylene)maleate prepared by Method A were added 500 parts of 1-butanol. To this 93.12 parts (one mole) of freshly distilled aniline were added over a period of two hours, under the refluxing temperature of 1-butanol. At the end of four hours of reaction time a sample was withdrawn and analyzed for free aniline by non-aqueous titration using 0.1 Normal perchloric acid. At the end of the eight hours, 98 percent of the aniline was reacted. The resultant product, poly [β-(N-phenylamino)oxytriethylene] succinate, is soluble in most of the common organic solvents and insoluble in water.

Example 2—Preparation of [(β-amino)oxytriethylene] succinate by reaction of unsaturated polyester with alcoholic ammonia.—To a reaction flask containing 240 parts of poly(oxytriethylene)maleate prepared by Method B were added 250 parts of absolute ethanol. To this were added 500 parts of absolute ethanol, conjoining 17.5 parts of dissolved ammonia, at a temperature of zero degrees centigrade over a period of two hours. After the completion of addition, the reaction mixture was allowed to reach room temperature for an additional two hours. A sample was withdrawn and analyzed as in Example 1. The resultant product, poly[(β-amino)oxytriethylene] succinate, is soluble in water.

Example 3—Preparation of poly[β-(O,O'-dimethylolphenoxy)-oxytriethylene]succinate by reaction of unsaturated polyester with O,O'-dihydroxymethylphenol.—Using 230 parts of unsaturated polyester prepared by Method A, 500 parts of toluene as a solvent and 123 parts of O,O'-dihydroxymethylolphenol as a nucleophilic substance, and the method of Example 1, the above polymer is produced. It is soluble in toluene and alcohols and insoluble in water.

Example 4—Preparation of poly[β-(2-thio-pseudourea)-oxytriethylene]succinate by reaction of unsaturated polyester with thiourea.—Using 230 parts of unsaturated polyester prepared by Method B, 500 parts of 1-butanol as a solvent and 76.12 parts (one mole) of thiourea, and the method of Example 1, the above polymer is produced. The polymer is partly soluble in water.

Example 5—Preparation of poly[β-ethylhydrogenphosphinyl]-oxytriethylene succinate.—To a reaction flask containing 230 parts of unsaturated polyester prepared by Method A are added 94 parts of ethyldihydrogen phosphinate (C$_2$H$_5$P(O)H$_2$) at a temperature of about 30 degrees centigrade over a period of about two hours. The resultant polymer is analyzed for phosphorus and is soluble in water.

(III) Methylolation

Example 6—Preparation of poly[β-(N-phenyl-N-hydroxymethyl)-oxytriethylene]succinate by reaction of polymer of Example 1 with aqueous formaldehyde.—To a reaction flask containing 350 parts of the polymer of Example 1, 85 parts (one mole) of 37 percent aqueous formaldehyde were added dropwise over a period of two hours at the temperature of 50 degrees centigrade. After the completion of addition of formaldehyde, the reaction mixture was stirred an additional two hours. The resulting reaction mixture was subjected to dehydration under reduced pressure at a temperature of 30 degrees centigrade to give the above polymer as a viscous liquid. A sample was withdrawn and subjected to infrared spectroscopy and found to contain N-methylol functionals. The resultant polymer, defined above, is soluble in most of the common organic solvents and insoluble in water.

Example 7—Preparation of poly[β-(N-phenyl-N-hydroxymethyl)-oxytriethylene succinate] by reaction of polymer of Example 1 with anhydrous paraformaldehyde.—The above polymer was prepared in a manner after Example 6, except that 13 parts (one mole) of paraformaldehyde were used instead of the 37 percent aqueous formaldehyde, and 500 parts of 1-butanol were used as a solvent, and the reaction conducted at the refluxing temperature of the 1-butanol. After about four hours the solvent was removed under reduced pressure at a temperature of 30 degrees centigrade to give the above polymer as a viscous liquid. A sample was analyzed as in Example 6 and found to contain N-methylol functionals. The polymer is also soluble in most common organic solvents and insoluble in water.

When trioxane is substituted for paraformaldehyde in Example 7, the same polymer is produced as obtained in Example 7.

Example 8.—When the polymer of Example 4 is reacted with paraformaldehyde in a manner after Example 7, the pendant 2-thio-pseudourea group on the polymer is methylolated.

Example 9.—When the polymer of Example 5 is reacted with paraformaldehyde in a manner after Example 7, the pendant phosphinyl group on the polymer is methylolated to a hydroxymethylethylphosphinyl pendant group.

(IV) Novolac preparation

Example 10—Preparation of poly[β-(N-phenyl-N-hydroxybenzyl)-oxytriethylene]succinate.—To a reaction flask containing 430 parts of the polymer of Example 6 were added 94 parts of phenol (one mole). The reaction mixture was subjected to dehydration under reduced pressure at the temperature of 75–85 degrees centigrade for three hours to give a very viscous resin. A sample was withdrawn and the hydroxyl number was determined to be the poly(amino methylated) phenol defined above.

Example 11.—When the modified polymer of Example 8 is reacted with phenol in a manner after Example 10, the pendant 2-thio-pseudourea group is alkylated to phenol through methylol functionals. This can be subsequently reacted with an aldehyde to give a C-methylolated novolac which can be cured thermally. Or it can be cured to the infusible state with hexamethylenetetramine. Or it can be cured with a resole.

Example 12.—When the modified polymer of Example 9 is reacted with phenol in a manner after Example 10, the pendant hydroxymethylethylphosphinyl group is alkylated to phenol through methylol (i.e., hydroxymethyl) functionals. This likewise can be subsequently cured to the infusible state by known methods, such as those mentioned in Example 11.

Example 13—Reaction of poly[β-(N-phenyl-N-hydroxymethyl)-oxytriethylene]succinate with phenolic novolac.—To a reaction flask containing 200 parts of the modified polymer of Example 6 were added 200 parts of a commercial phenolic novolac resin known in the trade as Durez #10 Resin, and reacted in a manner after Example 10, to give the low melting solid described above, which can be subsequently cured such as with hexamethylenetetramine to an infusible yet flexible resin.

Example 14—Reaction of poly[β-(N-phenyl-N-hydroxylmethyl)-oxytriethylene]succinate with sulfur novolac.—To a reaction flask containing 200 parts of a modified polymer of Example 6 were added 200 parts of a commercial sulfur novolac resin known in the trade as HLR 400 and reacted in a manner after Example 10, to give the low melting semi-solid resin described above. This can be cured with hexamethylenetetramine to an infusible yet flexible resin.

Example 15—Poly(N - methylol-N-phenyl)polyglycol succinate.—Into a 30 gallon Brighton Kettle, equipped with high pressure steam and electric heating units, a regulatable power stirrer with packed and unpacked columns to a condenser, was passed a mixture of glycols consisting of 4.13 parts of triethylene glycol, 11.05 parts of dipropylene glycol and 60.66 parts of polyglycol having a molecular weight of about 300, and heated to about 110 degrees centigrade. Then, under a nitrogen blanket, 29.04 parts of maleic anhydride were added. The kettle temperature dropped to about 75 degrees centigrade. It was then gradually heated under nitrogen and when the temperature reached 190 degrees centigrade, an exotherm started. All the heat was turned off. The exotherm reached 215 degrees centigrade and lasted for about 30 minutes. The reflux vapors were carried through a packed column to a condenser for better separation of water and glycol. At the end of about 3.5 hours of reaction, 1.5 parts of distillate were collected. The distillates were analyzed for glycol and shown to contain about seven percent of glycol by the refractive index method.

The reaction mixture was cooled to about 85 degrees centigrade and samples for acid number were withdrawn. At the end of 3.5 hours of reaction, the acid number was 45.50 milligrams of KOH per gram of sample.

At the end of 9.5 hours of total reaction time the acid number reached 20.00 milligrams of KOH per gram of sample and the reaction mixture became very viscous even at 180 degrees centigrade. At this point, dehydration was terminated and the reaction mixture was cooled to 80 degrees centigrade.

To this mixture 88 parts of n-butanol were added and then 27.79 parts of aniline were added. The reaction temperature was raised to the refluxing temperature of n-butanol, namely, about 120 degrees centigrade. A sample was withdrawn at the end of ten hours of reflux and analyzed for free aniline, and showed 89 percent of the aniline was reacted and 11 percent unreacted aniline remained. The reaction was refluxed for an additional three hours to bring the total unreacted aniline to five percent and at this point 9.51 parts of solid paraformaldehyde (of 96 percent pure material) were added. Periodically samples were withdrawn and examined for paraformaldehyde consumption. The resin was discharged into four containers. The yield was 140 parts of finished resin. This resin, having pendant N-methylol groups, can be subsequently utilized such as illustrated in Example 10.

The final product of Example 15 can be used in the formation of laminating resins, illustrated in Table I:

TABLE I.—LAMINATING RESIN FORMULATION

| Material: | Parts |
|---|---|
| Product of Example 15 | 280 |
| Resole (e.g., an A-stage phenolic resin) | 250 |

Example 16.—To 460 parts of poly(N-methylol-N-phenyl)polyglycol succinate of Example 15 were added 282 parts (3.0 moles) of phenol, an additional 47.8 parts (1.5 moles) of paraformaldehyde, 8 parts (0.05 mole) of tartaric acid and 20 milliliters of water. The reaction temperature was maintained at 100–110 degrees centigrade for one to two hours. Then the product was dehydrated to 160 degrees centigrade pot temperature at 10–15 millimeters mercury during a period of about two hours. The final product, poly(N-phenyl-N-hydroxybenzyl)aminopolyglycol succinate, is a base resin which can be used as a multi-purpose base resin. It can be further cross-linked in known ways, as explained in Example 11.

The final product of Example 16 can be used as reactive diluent for commercially available polyesters and also phenolic novolacs.

The final product of Example 16 can be used in a typical molding resin formulation shown in Table II:

TABLE II.—MOLDING RESIN FORMULATION

| Material: | Parts |
|---|---|
| Base Resin of Example 16 | 222.0 |
| Formalin (37 percent) | 120.0 |
| NaOH (anhydrous) | 2.8 |
| Formic Acid (85 percent) | 2.1 |

Example 17—Preparation of a flexible phenolic resin from poly[β - (N-phenylamino)oxytriethylene]-succinate and a resole.—To a flask equipped with stirrer and thermometer were added 250 parts of poly[β-(N-phenylamino)oxytriethylene]succinate made in accordance with Example 1, 200 parts of a commercially available resole (an A-stage phenolic resin), and 2 parts of sulfuric acid. The resulting mixture was stirred at room temperature for two hours to give a homogeneous mixture. The resulting product was dehydrated under reduced pressure at a temperature of about 50 degrees centigrade to give a light brown viscous resin which can be further cross-linked with hexamethylenetetramine or a resole to give infusible and insoluble, yet flexible material.

Example 18—Preparation of N-substituted polyaminoester modified flexible phenolic resins.—To a three-necked flask, fitted with a thermometer, mechanical stirrer, inert gas sparge and a water removal apparatus fitted with a condenser were added 116 parts (1.20 moles) of maleic anhydride, 300 parts (1.0 mole) of polyethylene glycol having a molecular weight of about 300, and 42.5 parts (0.4 mole) of diethylene glycol. The mixture was heated under a nitrogen blanket to 200–220 degrees centigrade and held until an acid number of 10 milligrams of KOH per milligram of sample was obtained. It was cooled to 100 degrees centigrade and then 221 parts (3 moles) of n-butanol were added. While stirring, 105 parts (1.13 moles) of aniline were added over a two hour period under n-butanol reflux. Heating was continued until more than 90 percent of the unsaturation had been reacted out.

After stripping off the n-butanol (98 percent recovery) and adding 235 parts (2.5 moles) of phenol and 243 parts (3 moles) of 37 percent formalin, the mixture was stirred at 60–70 degrees centigrade for 24 hours.

The water was stripped off at reduced pressure with an aspirator and dehydration continued up to 120 degrees centigrade until the theoretical amount of water was collected.

The product had the properties shown in Table III:

TABLE III.—PHYSICAL PROPERTIES OF POLY-AMINOESTER MODIFIED FLEXIBLE PHENOLICS

| State | Viscous liquid |
|---|---|
| Color | Light brown |
| Percent N | 2.14–4.2 |
| Hydroxyl number | 204–559 |
| Acid number | [1] 5–20 |
| Molecular weight (MW) | 400–3000 |
| Viscosity (strokes) | 15–90 |
| Non-volatile, percent | [2] 98 |
| Transparency | Good |
| Total percent aminoester backbone in resin | 25–50 |

[1] Acid number determined on the unsaturated polyester prior to reaction with aniline.
[2] 2 percent of volatile consists of formaldehyde and solvent.

Films were made from the product whose properties are described in Table III, by diluting with ethanol to sprayable viscosity. No additives or flow controlling agents were used. The resins were coated on standard Q panels, tin can stocks by means of a blade applicator (ASTM D-1436) and cured in a draft oven at 170 degrees centigrade for 30 minutes. Flexibility was checked with a conical mandrel over ⅛ inch diameter, and in the case of can stocks, bent into two 180 degree folds made at right angles (approximate) and the sharp edge examined. In all cases the film passed these standard tests with a rating of "excellent."

Various changes and modifications may be made in the method and compositions of this invention, certain preferred forms of which have been herein described, without departing from the spirit and scope of this invention. These modifications in this basic invention are to be regarded as within the scope and purview of this invention.

For instance, where a polymer is already available which contains an active pendant nucleophilic group containing at least one active hydrogen, then the method of this invention can be carried forward beginning with step (2). Examples of such known polymers are cellulose, polyaspartic acid, poly(3,5-octamethylene-4 amino 1,2,4-triazole), polyacrylamide oxime, polyvinyl alcohol and the like.

I claim:
1. A method which comprises:
   (1) reacting a polymer containing an $\alpha,\beta$-carbon-to-carbon unsaturated carbonyl function, with a nucleophilic compound having at least two active hydrogens, at a temperature from about zero to about 250 degrees centigrade to form a polymer containing an active pendant nucleophilic group containing at least one active hydrogen,
   (2) reacting the resultant nucleophilic group containing active hydrogen on the said polymer with an aldehyde, at a temperature from about zero to about 175 degrees centigrade, to form a polymer containing an active pendant methylol derivative group,
   (3) reacting the said pendant methylol derivative group with an aromatic compound containing an ortho-para activating group selected from the group consisting of —OH, —SH, and —NH$_2$, to form a modified polymer containing a pendant aralkylene group containing at least one nuclear hydrogen capable of further condensation with an aldehyde,
   (4) reacting the said pendant aralkylene group on the modified polymer with a compound selected from the group consisting of an aldehyde, a compound containing a C-methylol group, and mixtures thereof, at a temperature from about zero to about 200 degrees centigrade, to form a modified polymer containing a pendant aralkylene methylol polymer, and recovering the polymer so produced.

2. The method of claim 1 wherein the four steps are carried out in sequence in the same reaction vessel.
3. The polymer produced by the method of claim 1.
4. The cured product of claim 1.

References Cited

UNITED STATES PATENTS

| | | | |
|---|---|---|---|
| 3,363,025 | 1/1968 | Fitko et al. | 260—841 |
| 3,398,103 | 8/1968 | Kuhlkamp et al. | 260—849 |

FOREIGN PATENTS 1,410,798   8/1965   France.

OTHER REFERENCES

Nikitina et al.: "Nucleophilic Additions to Unsaturated Polyesters," Polymer Science, USSR, vol. 6, pp. 2374–2377, 1964.

MURRAY TILLMAN, Primary Examiner

JOHN C. BLEUTGE, Assistant Examiner

U.S. Cl. X.R.

117—128.4, 132, 155, 161; 156—331, 332, 335; 260—48, 50, 51.5, 55, 59, 67, 72.5, 828, 841, 842, 843, 849, 850, 838